Jan. 4, 1938.　　　E. D. CODDINGTON　　　2,104,506
STUD
Filed Sept. 3, 1935
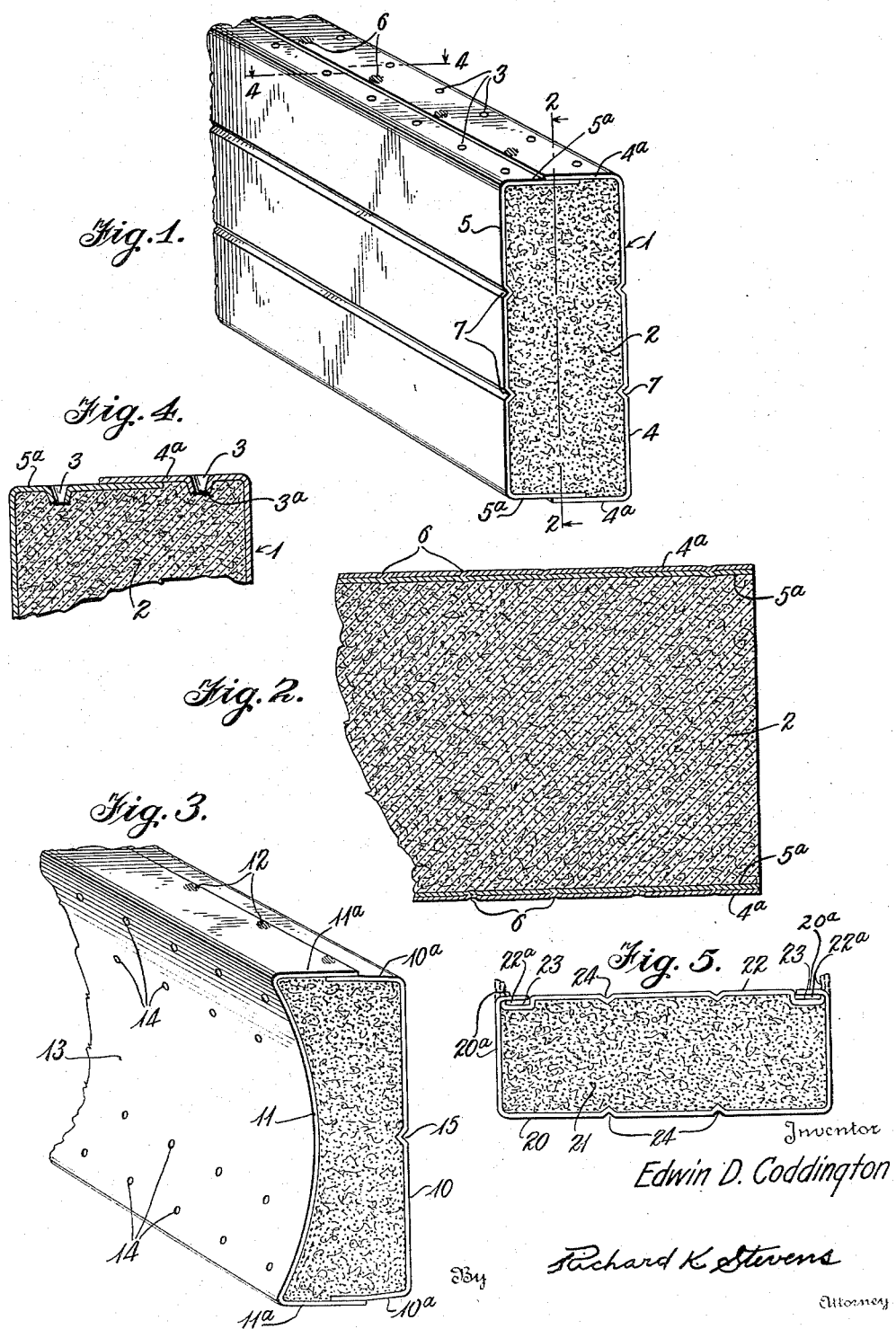
Inventor
Edwin D. Coddington
By Richard K. Stevens
Attorney Patented Jan. 4, 1938

2,104,506

UNITED STATES PATENT OFFICE 2,104,506

STUD

Edwin D. Coddington, Milwaukee, Wis., assignor to Reynolds Corporation, New York, N. Y., a corporation of Delaware Application September 3, 1935, Serial No. 39,024

5 Claims. (Cl. 72—115)

This invention relates to composite structural members designed to take the place of wooden beams, studs and plates in building construction. Structural members of this general character, because of their greater strength and their proof against fire, decay and attack by destructive insects are preferable to wood, while at the same time they possess the more important attributes of the latter, such as the capability of being sawed to length and of permitting nails to be driven thereinto so as to offer appreciable frictional resistance to their withdrawal.

In order to successfully compete with lumber, however, such composite structural members must lend themselves to rapid and economical manufacture so as to maintain their production cost and soles price at a minimum. It is therefore an important object of my invention to provide a strong and durable structural member of the above character which because of its simple construction is capable of high speed production and which because of the small cost of the materials entering into its fabrication may be placed upon the market at a comparatively low figure.

More particularly the invention aims to provide a structural member comprising a tubular casing of thin sheet metal enclosing a core of cementitious material, the casing being composed of two longitudinal half sections of channel shape arranged in opposition with their flanges overlapped and united as by welding.

A further object of the invention is to provide a structural member in which the casing is reinforced along two of its opposite faces by a double thickness of metal enabling it to more effectively resist bending stresses which, if excessive, will cause rupturing of the core.

Other objects and advantages of the invention will become apparent from the following detailed description of certain preferred embodiments thereof, reference being had to the annexed sheet of drawing in which:

Figure 1 is a perspective view of one end of a stud;

Figure 2 is a longitudinal cross-sectional view taken through the stud of Fig. 1 on the line 2—2;

Figure 3 is a perspective view of an end of another form of stud;

Figure 4 is a fragmentary transverse cross-sectional view through the stud on the line 4—4 of Fig. 1; and Figure 5 is a transverse cross-sectional view through still another form of stud.

As shown in Fig. 1 the stud comprises a sheet metal casing 1 of generally rectangular cross-section enclosing a core 2 of nailable cementitious material, such for example as a mixture of gypsum, Portland cement and sawdust represented approximately in the proportions, by weight, 55:20:9. This filler of cementitious material may be introduced into the casing in a dry state, moisture afterwards being added to cause crystallization of the cement and gypsum as described and claimed in my copending application Serial No. 39,022.

In order to afford means for introducing moisture into the filler during fabrication of the stud and subsequently for allowing excess moisture to evaporate therefrom so that both wetting and curing of the material proceeds uniformly throughout the length of the member, a series of perforations 3 arranged in parallel rows extending lengthwise along the top and bottom faces of the stud are provided. Preferably these perforations are punched in the casing prior to filling, the punching operation resulting in the formation of burrs 3a surrounding the openings on the inner surface of the casing, which burrs are enclosed by the filler (as shown in Fig. 4). These burrs, upon hardening of the filler, serve to anchor the casing to the core.

The casing is composed of two opposed right-angled channel sections 4 and 5 arranged with their flanges 4a and 5a, respectively, extending in overlapped relation. In assembling the casing the flanges 4a of one of the sections 4 are slipped or sprung over the corresponding flanges 5a of the other section 5 and the two sections telescope together an extent corresponding to the desired thickness of the structural member. The overlapped flanges are spot welded together as indicated at 6 at short intervals lengthwise of the member so that the casing presents a seam constituted of a double layer of metal upon its top and bottom extending throughout the length of the member, and consequently serving to rigidify the same.

In order to stiffen the wider side walls of the casing a plurality of stiffening ribs 7 may be pressed therein coextensive with the length of the stud. These ribs prevent bulging of the casing during introduction of the filler thereinto in the process of fabrication of the stud, and add greatly to the strength of the finished stud under compression.

In Fig. 3 I disclose another form of stud, the construction of which closely approximates that of Fig. 1. This stud comprises two channel sections 10 and 11 having the flanges 10a of channel section 10 tucked under the flanges 11a of channel section 11, these flanges being welded together as at 12. Instead of the two sections being complementary in shape, section 10 forming one side wall of the stud is right-angled, while the companion section 11 is dished as indicated at 13. The flanges 10a of section 10 are slightly inclined up to the beginning of their underlap with the flanges 11a of section 11, resulting in a stud of the cross-sectional shape shown in the figure. This form of stud possesses a high degree of strength and provides three substantially flat nailing surfaces for the attachment of other framing members thereto. Rows of perforations 14 may be punched in the sides of the casing adjacent its top, as shown, for the purpose stated above.

The flat side wall of the stud composed of channel section 10 is advantageously provided with an inwardly directed stiffening rib 15 intermediate its height and extending throughout the length of the stud. And of course any number of these ribs may be provided as may be found desirable and they may be located upon either the straight or dished sides of the member or upon both.

Fig. 5 illustrates another form of stud composed of a relatively deep channel section 20 having upright flanges 20a which latter constitute the top and bottom walls of the stud. The channel encloses a nailable core 21 which may be of the composition described above. Closing the open end of the channel 20 is a second channel 22 of approximately the same width as the first mentioned channel and provided with narrow upright flanges 22a. In the course of manufacture of the stud the shallow channel 22 is telescoped a short distance within the deeper channel 20 to enclose the core 21. The superposed flanges 20a and 22a of the two channels are spot welded or otherwise secured against longitudinal movement or separation and then bent over from the dotted lines to the position shown in Fig. 5, into longitudinal depressions 23 formed in the channel 22 at the bases of the flanges 22a.

The two channels are thus locked together in rigid association completely enclosing the core and forming therewith a stud of rectangular cross-section. Longitudinally-extending inwardly-directed ribs 24, corresponding to the ribs 7 and 15 of the studs of Figs. 1 and 3, may be provided in the bottoms of the channels to rigidify the stud.

The structural members just described may be made in optional sizes suitable for use as rafters, stringers, joists, bucks or the like. And it will be obvious that the invention may assume other forms than those described above which are to be considered simply as exemplary and not as limiting the scope of the invention.

I claim:

1. A composite structural member comprising a tubular casing of nail-penetrable sheet metal, and a cementitious nailable core enclosed by the casing, said casing comprising a pair of channel sections having their flanges arranged in overlapped relation so as to provide a double thickness of metal extending along the top and bottom faces of the member, and one of the channel sections being transversely dished intermediate its flanges.

2. A composite structural member comprising a tubular casing of nail-penetrable sheet metal, a cementitious nailable core enclosed by the casing, said casing comprising a pair of channel sections having their flanges welded together in overlapped relation so as to provide a double thickness of metal extending along the top and bottom faces of the member throughout its length, one of the sections being transversely dished, and the flanges of the other channel being slightly inclined beyond their areas of overlap.

3. A composite structural member comprising a tubular casing of nail-penetrable sheet metal, a cementitious nailable core enclosed by the casing, said casing comprising a pair of channel sections disposed one within the other with their flanges arranged in superposed relation and bent inwardly of the member and against the bottom of one of the channel sections.

4. A composite prefabricated structural member comprising a longitudinally closed tubular casing of relatively thin, nail-penetrable sheet metal, a cementitious nailable core enclosed by the casing, said casing comprising a pair of reversely disposed channel members of slightly different widths having straight flat terminal flanges, the flanges of the wider channel member overlying the flanges of the companion channel member so as to provide a double thickness of metal extending along the top and bottom faces of the structural member, and bonding means between the overlapped flanges to maintain the channel members in rigid assembly.

5. A composite prefabricated structural member comprising a longitudinally closed tubular casing of relatively thin, nail-penetrable sheet metal, a cementitious nailable core enclosed by the casing, said casing comprising a pair of reversely disposed channel members of slightly different widths having straight flat terminal flanges, the flanges of the wider channel member overlying and rigidly united by welding to the flanges of the companion channel member so as to provide a double thickness of metal extending along the top and bottom faces of the structural member, and a stiffening rib formed in one of said channel members intermediate its flanges and extending substantially throughout its length.

EDWIN D. CODDINGTON.